United States Patent
Hui et al.

(10) Patent No.: US 9,631,388 B2
(45) Date of Patent: Apr. 25, 2017

(54) FLOATING POOL WATER CONTROLER

(75) Inventors: Wing-kin Hui, Hong Kong (HK);
Wing-tak Hui, Hong Kong (HK)

(73) Assignee: COMPUROBOT TECHNOLOGY COMPANY, Dongguan (CN)

( * ) Notice: Subject to any disclaimer, the term of this patent is extended or adjusted under 35 U.S.C. 154(b) by 446 days.

(21) Appl. No.: 13/372,455

(22) Filed: Feb. 13, 2012

(65) Prior Publication Data

US 2013/0206660 A1  Aug. 15, 2013

(51) Int. Cl.
*E04H 4/12*  (2006.01)
*C02F 1/46*  (2006.01)
*C02F 103/42*  (2006.01)

(52) U.S. Cl.
CPC ......... *E04H 4/1281* (2013.01); *C02F 1/4606* (2013.01); *C02F 2103/42* (2013.01); *C02F 2201/009* (2013.01); *C02F 2201/4614* (2013.01); *C02F 2209/008* (2013.01)

(58) Field of Classification Search
CPC .... C02F 1/461; C02F 1/46104; C02F 1/4678; C02F 1/50; C02F 2001/461; C02F 2201/4612; C02F 2201/4614; C02F 2209/00
USPC .. 210/167.11, 205, 764, 143, 242.1, 748.18; 204/555, 196.22
See application file for complete search history.

(56) References Cited

U.S. PATENT DOCUMENTS

| | | | | |
|---|---|---|---|---|
| 4,713,170 | A * | 12/1987 | Saibic | 210/85 |
| 5,059,296 | A * | 10/1991 | Sherman | 204/229.8 |
| 6,217,780 | B1 * | 4/2001 | Denkewicz, Jr. | A01N 59/16 210/192 |
| 6,238,555 | B1 * | 5/2001 | Silveri et al. | 210/143 |
| 6,508,929 | B1 * | 1/2003 | Mercer | 205/701 |
| 6,576,594 | B2 * | 6/2003 | Nier | A01N 59/20 210/705 |
| 2004/0173542 | A1 * | 9/2004 | Porat | 210/760 |
| 2005/0263445 | A1 * | 12/2005 | Collins | 210/169 |
| 2006/0113256 | A1 * | 6/2006 | Birkbeck | C02F 1/4606 210/748.17 |
| 2008/0290039 | A1 * | 11/2008 | King | C02F 1/008 210/739 |

* cited by examiner

Primary Examiner — Fred Prince
(74) Attorney, Agent, or Firm — Weiss & Moy, P.C.; Jeffrey D. Moy

(57) ABSTRACT

Disclosed herein is a floating pool water controller for dispensing germicide and antimicrobial material into a swimming pool based upon real time pool conditions. The controller includes the ability to adjust to these ever changing conditions in real time, and, to do so remotely. The controller includes a housing adapted for floating on the pool water. Additionally, a dispenser is provided for dispensing Cu ion into the pool and includes a dispenser assembly connected to the housing. The controller is provided with a controller for adjusting the amount of Cu ion dispensed into the pool water. And, the controller includes a probe extending from the housing into the pool water for sensing pool conditions. Thus, upon sensing the pool conditions in real time, the controller can be adjusted to dispense the proper amount of Cu ion into the pool water.

16 Claims, 8 Drawing Sheets

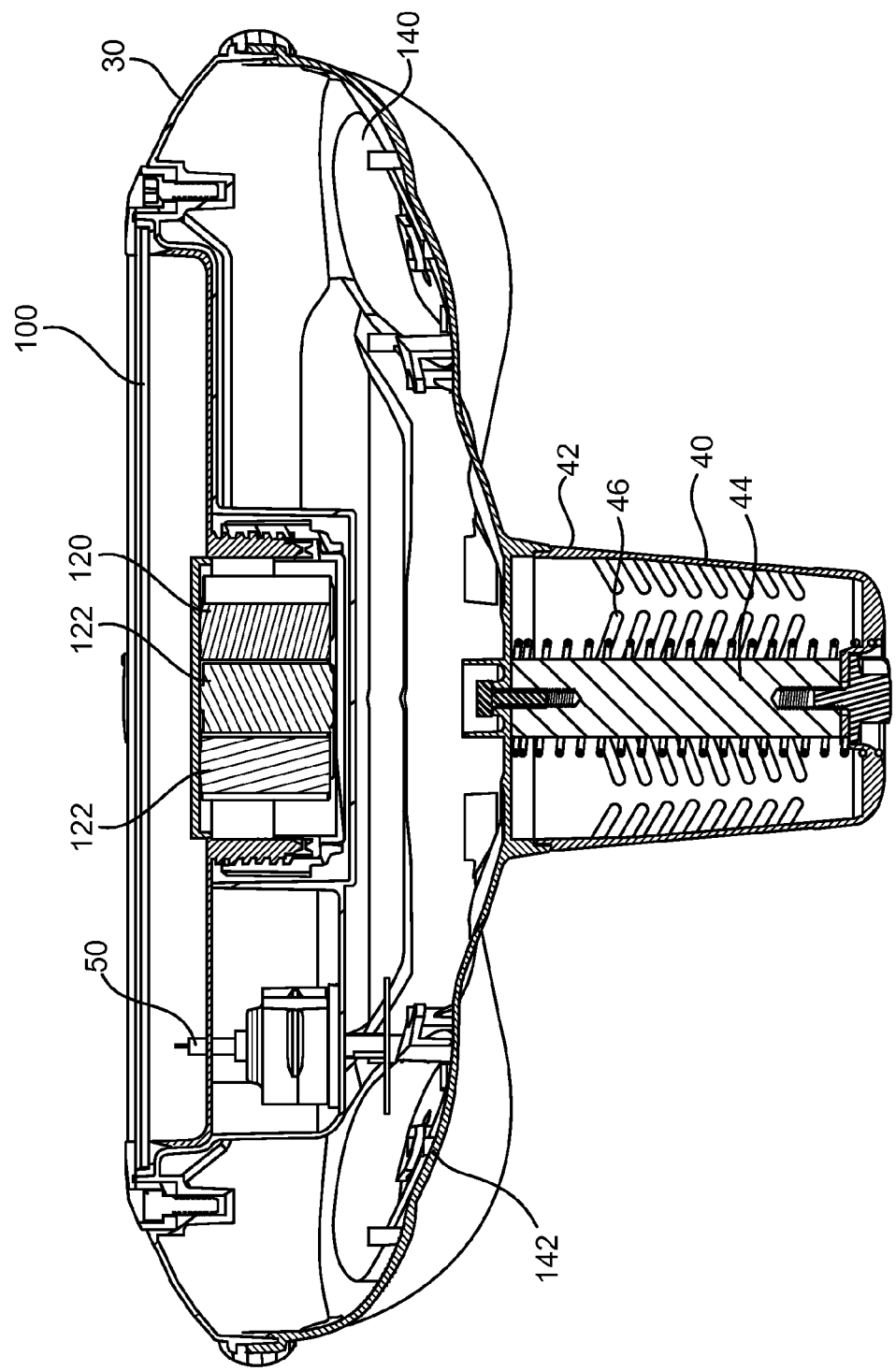

FLOATING POOL WATER CONTROLER

FIELD OF THE INVENTION

This invention relates to a device for adding material to pool water for cleansing a pool. More particularly, this invention relates to such devices, which float on the surface water of a pool, while adding material, which cleanses the pool water and makes it safe for swimmers.

TECHNICAL BACKGROUND

The joys of pool ownership cannot be measured in mere dollars and sense. Having a pool provides the pool owner with a fun and healthful experience for children and adults, alike. In fact, it brings out the child in all of us, regardless of our age. And, when the pool is not in use, it provides a sense of peace and tranquility such as by that experienced by those relaxing by a calm lake. In our modern lifestyle such peaceful times cannot be overestimated.

And, of course, achieving these positives attributes of pool ownership is accompanied by an underlying responsibility to provide safe and healthful water for swimmers and other users. In fact, millions of dollars are spent each year in an effort to provide such clean and healthful water for pool users. For example there are sweepers and cleaners and other devices designed for such purposes. Additionally, other devices assist with adding material to the pool to keep harmful bacteria and microbes at bay.

One such device is shown generally by the numeral 200 illustrated in FIG. 2. The device 200 is a floating pool cleaner known in the art. The device 200 serves to add chemicals to the water in an effort to clean and purify the water. Typically, the device 200 floats on the top surface of the water. The device 200 has a bottom 202, which includes a downwardly extending member 204. Member 204 typically includes a brass rod 206 and a coil 208, which can be electrically charged. The coil 208 is wrapped around the brass rod 206.

As illustrated, the coil 208 and the brass rod 206 are exposed to pool water. The object of this structure is to cause a chemical reaction between the brass rod 206 and the electrically charged coil in an aqueous solution, whereupon, the result is providing Cu ion into the pool. The Cu ion is dispensed into the water upon an electrical charge being applied to the coil 208. An electrolytic reaction is started, which results in the production of Cu ions in the aqueous solution or pool water in this case.

As will be appreciated by those skilled in the art, the Cu ions freely enter the pool without control or limit. Once the current level has been established and the device 200 launched, there are no controls. As long as current is applied to the coil 208, Cu ions will be produced and continue to be dispensed within the pool. The only limit will be the life of the electrical supply, such as a battery or the mass of the brass rod.

Cu ion in a pool is generally quite helpful. The Cu ion acts as a germicide and an antimicrobial. However, in too large a quantity, the pool water can turn green and become unpleasant and even unswimmable. In too small a quantity, there will be insufficient Cu ion present in the pool water to perform as desired. Thus, as long as the exact right amount Cu ion enters the pool all goes well.

However, unless the precise real time conditions of the pool water are monitored, it would be relatively impossible to know just how much Cu ion needs to be added to a pool. Thus providing the exact right amount of Cu ion to the pool water would seem to be the exceptional case and not the rule.

How much Cu ion enters the pool should ideally be based on the temperature and water conductivity. Different temperatures provide different levels of conductivity. Also, the precise chemical composition of the water may change or alter during the swimming season. Ideally, one should then change the amount of Cu ion added to the water.

Using presently known devices, such as the device 200, such conditions are not possible and not considered as Cu ion enters the pool water. In fact, in some cases, the additional amounts of Cu ion into the pool water causes the discoloration of the water and a "bad" taste to develop in the water. In more extreme cases, the water can become unusable. In some extreme cases, the entire pool will need to be emptied and refilled. The costs of emptying and refilling a pool and then balancing the water for use, can indeed be costly in terms of financial as well as social costs.

Thus, there exists a long felt need to provide a means and a structure for being able to adjust the amount of Cu ion being dispensed into the pool. The amount of Cu ion dispensed into the pool must be based upon the relevant conditions, which provide the pool owner with at least the best possible chance of getting the pool to ideal conditions and at worst preventing the extreme cases as described above, where the pool water needs to be replaced and the initiation process of preparing swimming water for human use begun again. In the below description, the invention will be described which provides a floating pool water controller that solves this long felt need.

SUMMARY OF THE INVENTION

Accordingly to overcome the above mentioned disadvantages of the known devices and to solve the long felt needs in the art, it is a general object of the floating pool water controller in accordance with this invention to provide a device which dispenses germicide and antimicrobial material into a swimming pool based upon known conditions of the pool water.

It is an additional object of the floating pool water controller in accordance with this invention to provide a device, which is adjustable in response to real time pool conditions, thereby; the amount of germicidal and antimicrobial material entering the pool is likewise adjustable.

It is a additional object of the floating pool water controller in accordance with this invention to provide a device as set forth above, which adjustable, and wherein adjustments are done remotely, while the controller floats in the pool and even when the pool owner is not physically present.

In accordance with the objects set forth above and as will be described more fully below, the floating pool water controller in accordance with this invention, comprises:

A floating pool water controller for dispensing germicide and antimicrobial material into a swimming pool, the controller comprising:
  a housing adapted for floating on the pool water;
  means for dispensing Cu ion into the pool water defining a dispenser assembly, the dispenser assembly connected to the housing;
  control means for adjusting the amount of Cu ion dispensed into the pool water connected to the housing; and
  sensing means defining a probe extending from the housing into the pool water for sensing pool conditions, whereby, upon sensing the pool conditions the controller can be adjusted to dispense the proper amount of Cu ion into the pool water.

In an exemplary embodiment, the germicide and antimicrobial material defines Cu ion created by an electrolytic reaction between the elements of the dispenser assembly and the pool water.

In one particular exemplary embodiment, dispenser assembly includes a brass and a coil wrapped around the ingot. The coil is made of stainless steel. While the dispenser assembly sits in the pool water, an electrical current is applied to the stainless steel coil and an electrolytic reaction between the dispenser elements, while in pool water begins. The result of the electrolytic reaction causes Cu ion to be dispensed into the pool. In this particular exemplary embodiment, there is provided a controller switch for controlling the amount of current, which is applied to the stainless steel coil. The controller switch is used to adjust the current and thereby electrolytic reaction within the dispenser assembly. Thusly, the amount of germicide and antimicrobial material entering the pool water is likewise adjusted.

In another exemplary embodiment in accordance with this invention, the controller includes a probe which monitors and records pool conditions. These conditions include temperature, pH level, total chlorine level, total alkalinity as well as other conditions affecting the water's conductivity and ability to accept Cu ion. The probe records the data and sends it to a remote receiving appliance, such as a cell phone. It will be appreciated that such a transmission may well be in the form of an "app" of the kind used by today's "smart phones." This allows the person monitoring the pool and responsible for pool conditions to alter and adjust the amount of Cu ion entering the pool. Thus, for example, a father may be at work on the day of his daughter's birthday pool party and despite being at a remote location and performing necessary family and work related duties continue to be responsible for his daughter pool party in an effective and meaningful manner.

It is an advantage of the floating pool water controller to provide germicide and antimicrobial material to pool water based upon real time water conditions.

It is an additional advantage of the floating pool water controller to provide germicide and antimicrobial material to pool water based upon real time water conditions using remote connections and make necessary adjustments while being remote to the pool's location.

BRIEF DESCRIPTION OF THE DRAWING

For a further understanding of the objects and advantages of the present invention, reference should be made to the following detailed description, taken in conjunction with the accompanying drawing, in which like parts are given like reference numerals and wherein:

FIG. 5 is a cross-sectional view of an exemplary embodiment of the floating pool water controller in accordance with this invention.

DETAILED DESCRIPTION OF THE INVENTION

In order to appreciate the invention herein, one must appreciate the need in the art as set forth in the Background. Most importantly, the structure of the instant invention herein resolves the long felt need to remotely view and respond to pool conditions in real time.

Figure 3:
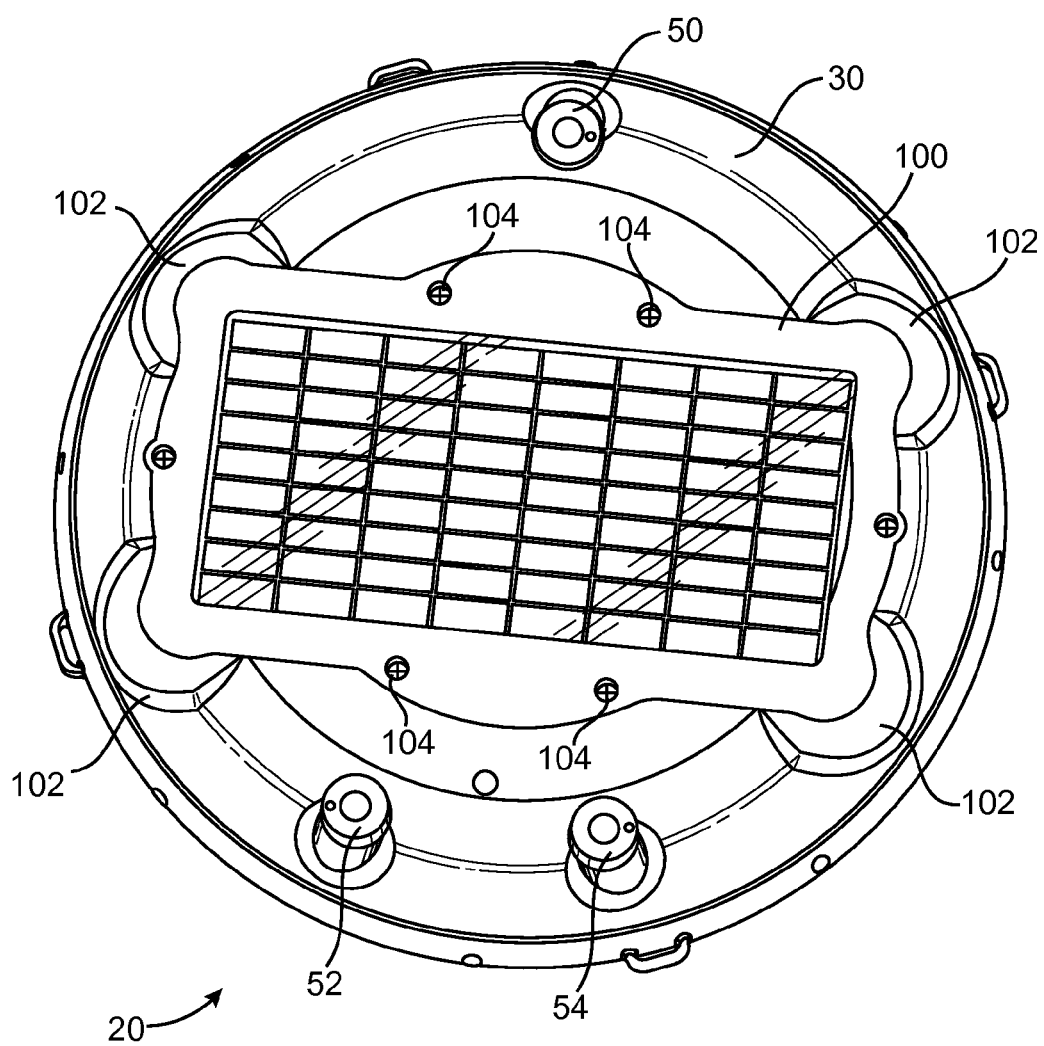
FIG. 3 is a top plan view of an exemplary embodiment of the floating, pool water controller in accordance with this invention.
Figure 6A:
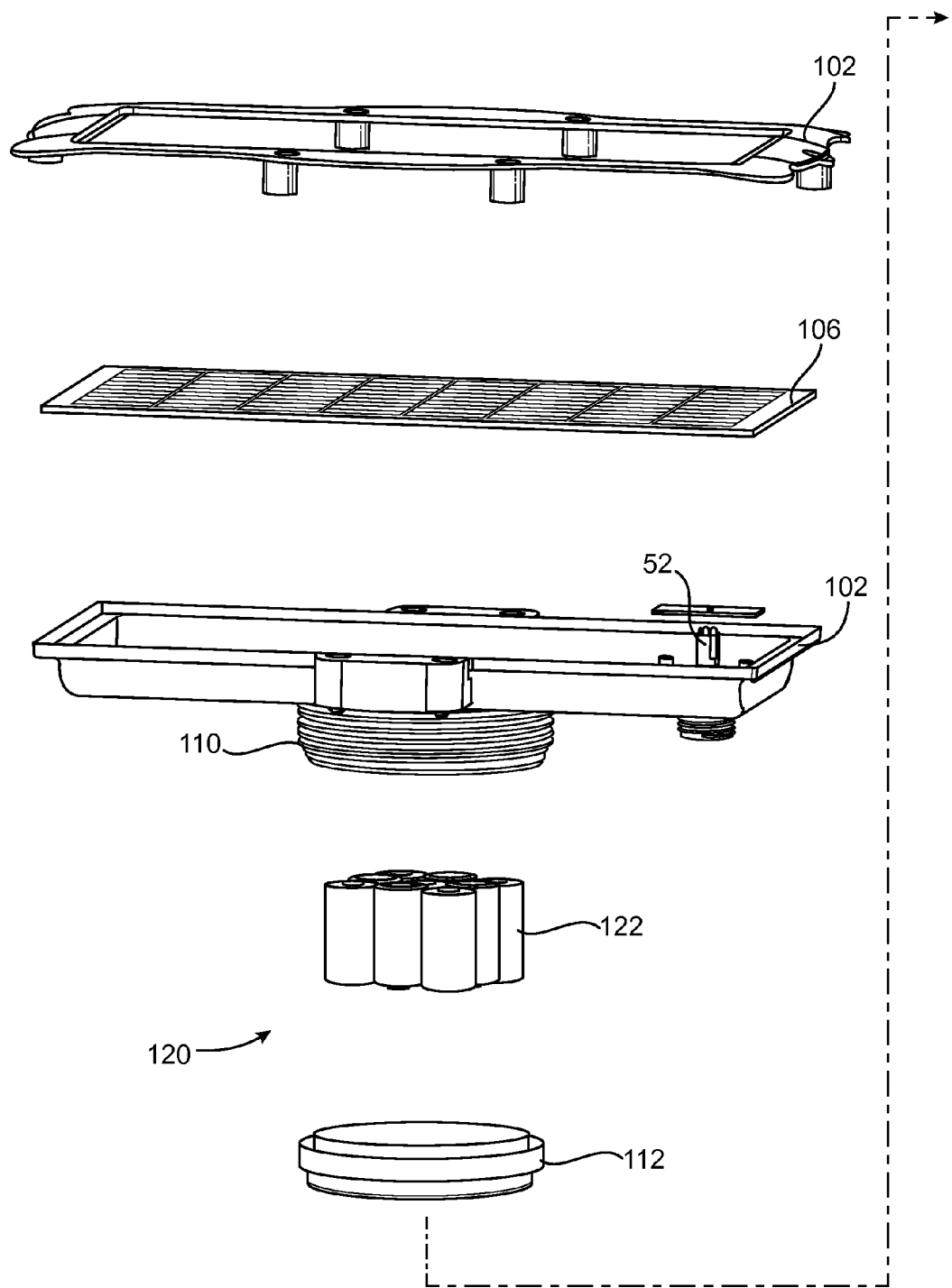
FIGS. 6A-6C illustrate an exploded perspective view of an exemplary embodiment of the floating pool water controller in accordance with this invention.
Figure 6B:
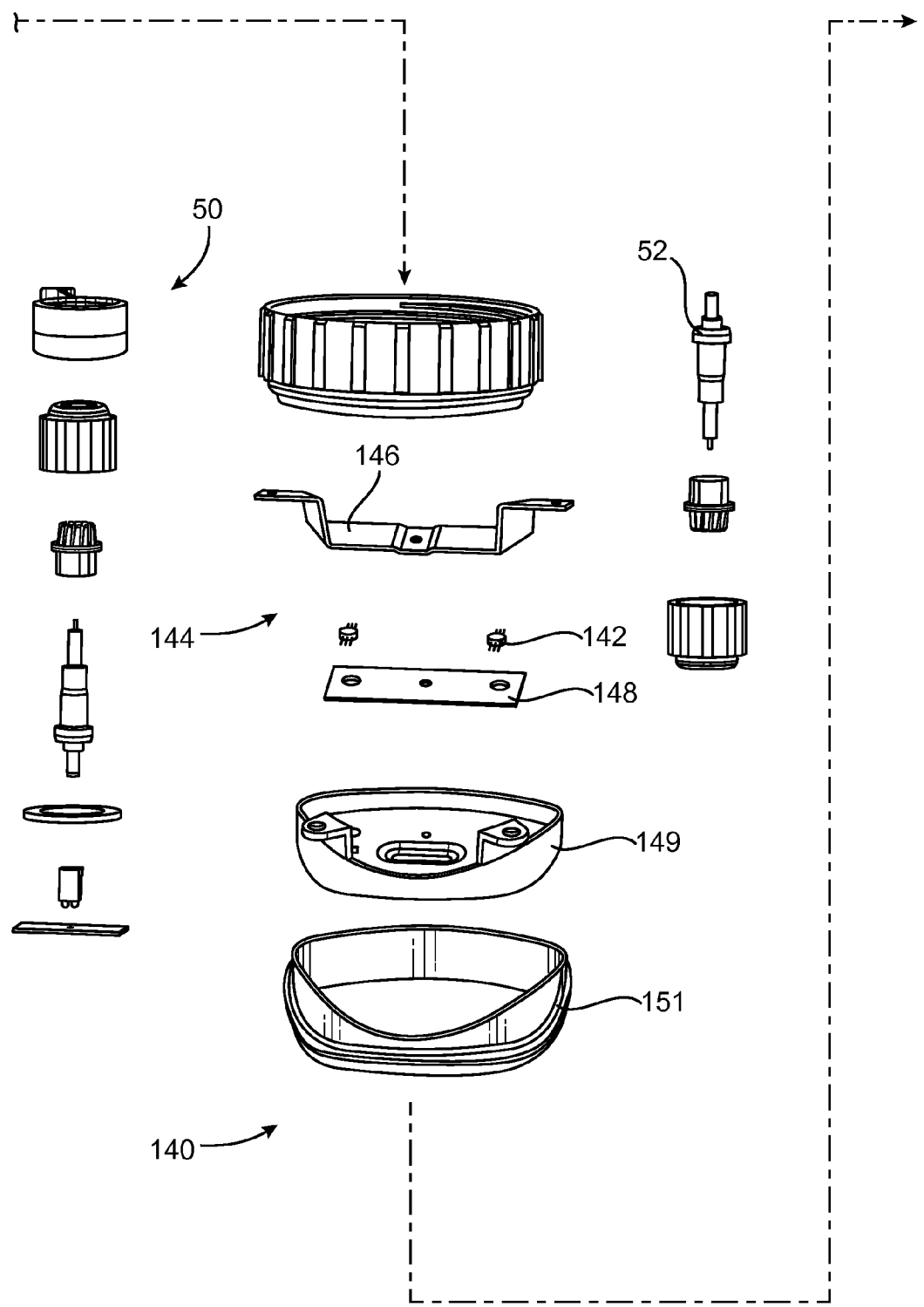
Figure 6C:
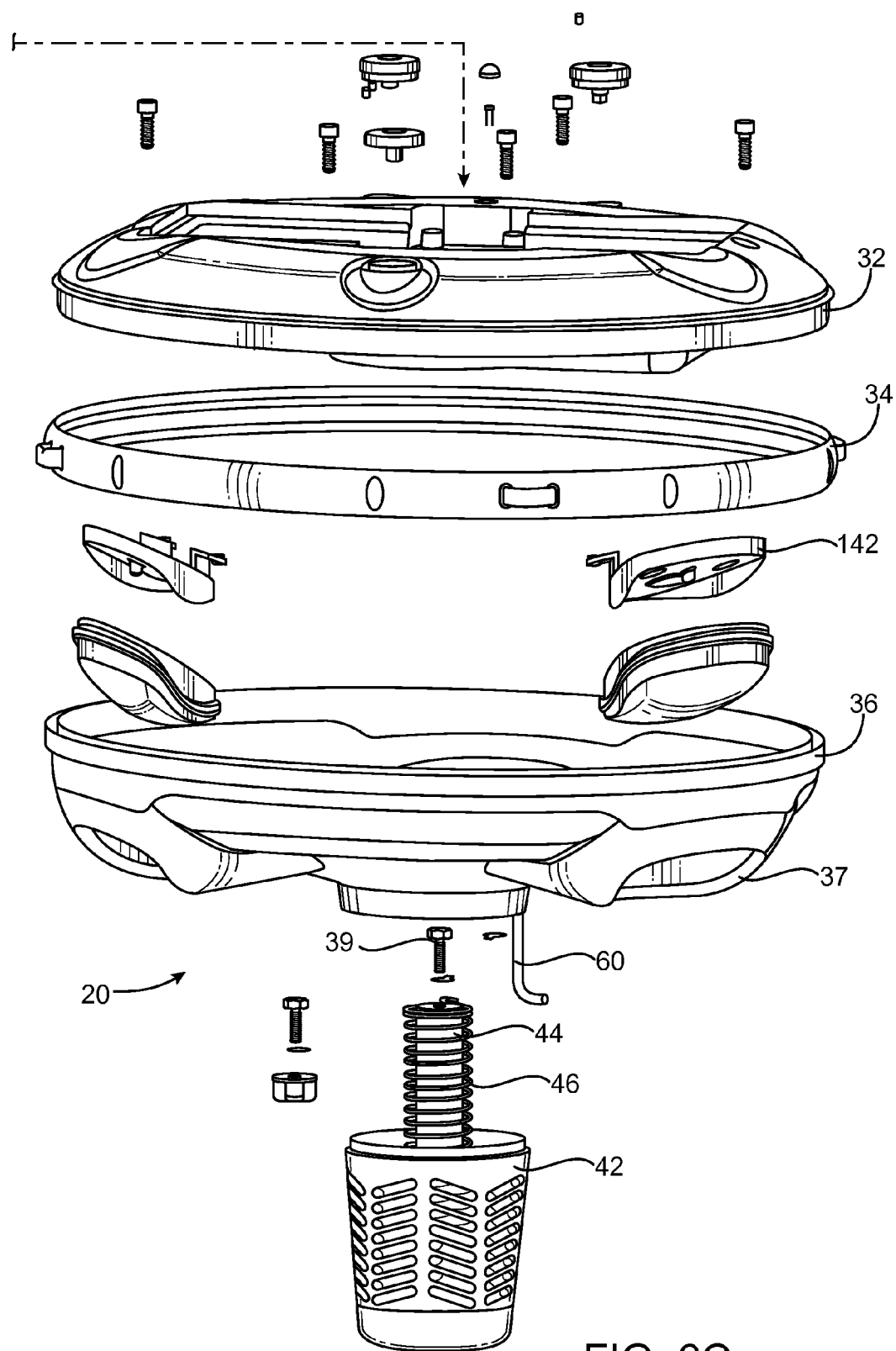

With particular reference to FIGS. 3, 4, 5 and 6A-6C, there is shown the invention generally indicated by the numeral 20, FIG. 3. The instant invention will now be described with reference to FIGS. 3-5, which illustrate the basic structure of the floating pool water controller in accordance with this invention generally denoted by the numeral 20. The floating pool water controller 20 includes a housing 30, which floats upon the pool water. Also, included is a dispenser 40 for dispensing Cu ion into the water, a control member 50 for adjusting the amount of Cu ion entering the water and a probe 60 for sensing pool conditions (FIG. 6C).

Figure 4:
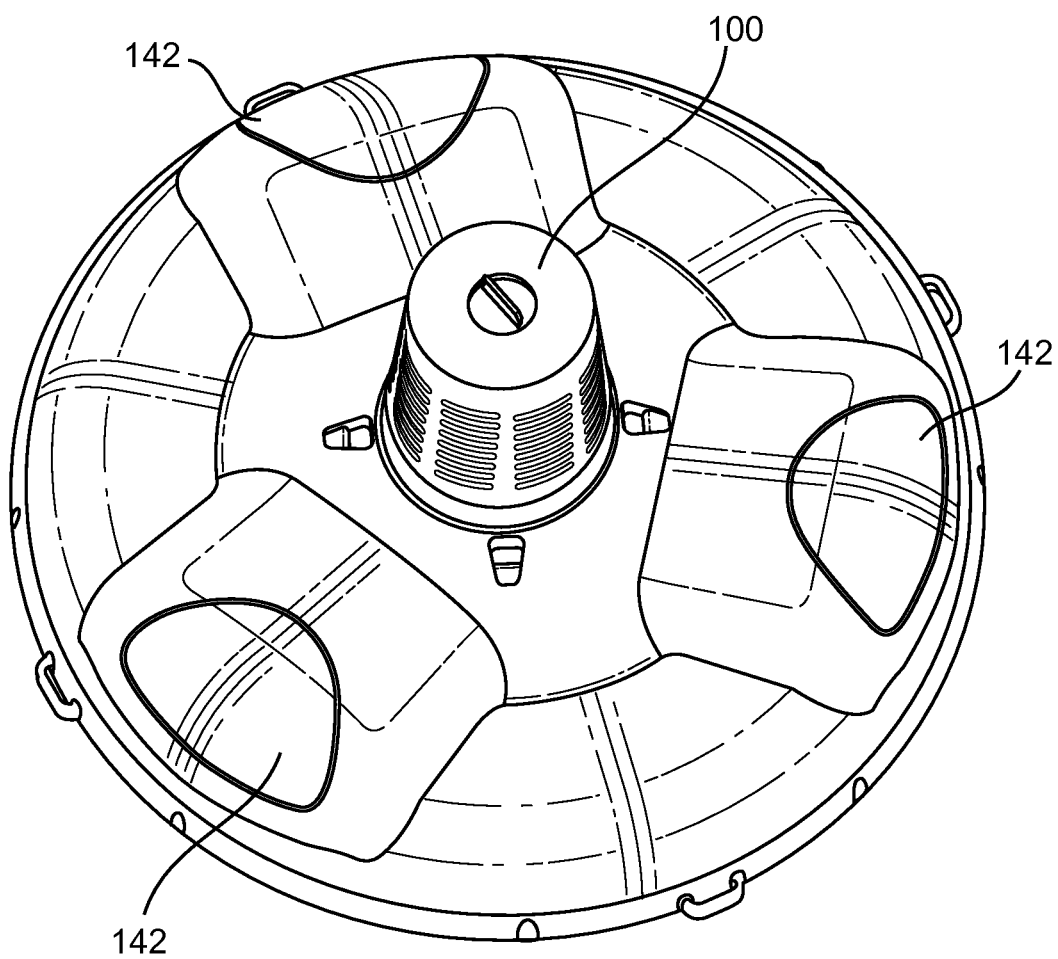
FIG. 4 is a bottom plan view of an exemplary embodiment of the floating pool water controller in accordance with this invention.

As shown in FIGS. 3-5, an exemplary embodiment of the controller 20 includes a solar cell 100. The solar cell 100 is mounted on the housing atop the floating portion. As will be explained in more detail with respect to FIGS. 6A-6C, the solar cell 100 provides electrical power for recharging and powering the electrical power source 120.

The solar cell 100 removably mounts in the seats 102 provided in the housing 30. Screws 104 secure the solar cell 100 to the housing 30 and can be easily removed for repair or replacement of the solar cell.

The controller 20 additionally includes an electrical power source 120. In an exemplary embodiment shown in FIGS. 3-5, the electrical power source includes a set of rechargeable batteries 122. During the day, the sun provides electrical power to the solar cell 100. The solar cell 100 is electrically connected to the rechargeable batteries 122, thereby keeping the batteries and the electrical power source charged for use. During the evening hours or on cloudy days, the rechargeable batteries provide adequate energy for maintaining controller function.

The controller 20 additionally includes a pool lighting member 140. Again, during the evening hours, the rechargeable batteries provide sufficient energy for lighting the lighting member. The lighting member defines an LED assembly 140, which includes one or more high efficiency, high output LED's 142. There are three LED's 142 mounted at the bottom of the housing 30 as shown particularly in FIGS. 4 & 5. The LED's 142 are electrically connected to the rechargeable batteries 122.

As shown particularly in FIG. 5, the dispenser 40 includes a sub-housing 42 defining a dispenser housing attached to the bottom of the housing 30. The dispenser housing 42 extends from the bottom surface of the housing 30 into the pool as the controller 20 floats upon the pool. The dispenser housing 42 is a vented structure for allowing water to pass therethrough.

In an exemplary embodiment, a brass ingot 44 is mounted within dispenser housing 42. A stainless steel coil 46 wraps around the brass ingot 44 and similarly is mounted within the dispenser housing 42. The stainless steel coil 46 is electrically connected to the power source and in an exemplary embodiment, the rechargeable batteries 122.

The controller 50 can allow more or less current to be applied to the stainless steel coil 46. As more current is applied to the stainless steel coil 46, the reaction with the brass ingot increases and therefore more Cu ion is dispensed to the pool water.

As will be appreciated by those skilled in the art, a brass ingot is an alloy of various metals, primarily, Cu and Zn. However, in order to enhance the properties of providing germicidal and antimicrobial product into the water, other elements and materials may be added and the composition of the Cu and Zn changed to fit a particularly purpose.

For example, Ag (silver) may be introduced into the bras ingot or the ratio of Cu to Zn changed depending upon the result desired. For example, the introduction of a Cu—Ag ion into the pool is known to having longer lasting beneficial results to cleaning pool water than the mere introduction of Cu ion. In any case, each of these variations is within the spirit and scope of this invention.

With particular reference to FIG. 3, there is shown two additional controllers 52 and 54. In an exemplary embodiment, controller 52 defines an on/off switch for the controller itself, while controller 54 regulates the current to the LED's 142.

With particular reference to FIGS. 6A-6C, there is shown an exploded view of an exemplary embodiment of the controller 20. The following is a detailed description of the selected elements of the controller 20. Particularly, with reference FIG. 6A, there is shown the solar cell 100. The solar cell 100 includes a tray 102, a frame 104 and a solar panel 106 sandwiched between the two. Fasteners (not shown) removably connect the tray 102 and the frame 104 and lock the solar panel in place.

The bottom of the tray 102 provides for electrical connection with the power source 120 and specifically, the batteries 122. A portion of the bottom of the tray 102 defines a battery compartment 110. The batteries 122 fit within the battery compartment 110 and are locked in place with battery locking member 112. Within the tray 102, electrical connections are provided to on/off switch 52.

With particular reference to FIG. 6B, there is shown the LED assembly generally indicated by the numeral 140. The LED assembly 140 is electrically connected to the power source 120 and in particular, the batteries 122. The LED assembly 140 includes one or more LED's 142. The exemplary embodiment in FIG. 6B includes two LED's. Other exemplary embodiments have more than two LED's are within the spirit and scope of this invention.

The LED's 142 are held in place by a frame assembly 144, having a first member 146 and a second member 148. The members 146 and 148 sandwich the LED's 142 between them. The frame assembly 144 with the LED's in place is fixed to a housing 149. A lens cover 151 covers the housing 149. In various exemplary embodiments in accordance with this invention, the lens cover 151 is clear, colored or multi-colored. All such embodiments are within the spirit and scope of the invention.

Also shown in FIG. 6B are controller switches 50 and 52 in greater detail.

With particular reference to FIG. 6C, there is shown an exploded view of the housing generally indicated by the numeral 30. The housing 30 includes three sections, a top 32, middle 34 and a bottom 36. As noted above, with respect to FIG. 3, the solar cell 100 sits on the seats 102 in the top section. Also as shown, the LED assemblies 142 are mounted in the bottom section 36 in provided openings 37. The openings 37 are sized and shaped to allow the LED assemblies 142 to fit securely within the bottom section 36.

FIG. 6C also illustrated attachment of the dispenser 40 to housing 30. Screws 39 threaded to the appropriate structure hold the dispenser 40 in place.

The middle section 34 wraps around the top and bottom sections 32 and 36, respectively. In order to secure the sections together, the middle section 34 is snap fit in place over the other sections for semi-permanent assembly of the housing 30.

In Use

Figure 1:
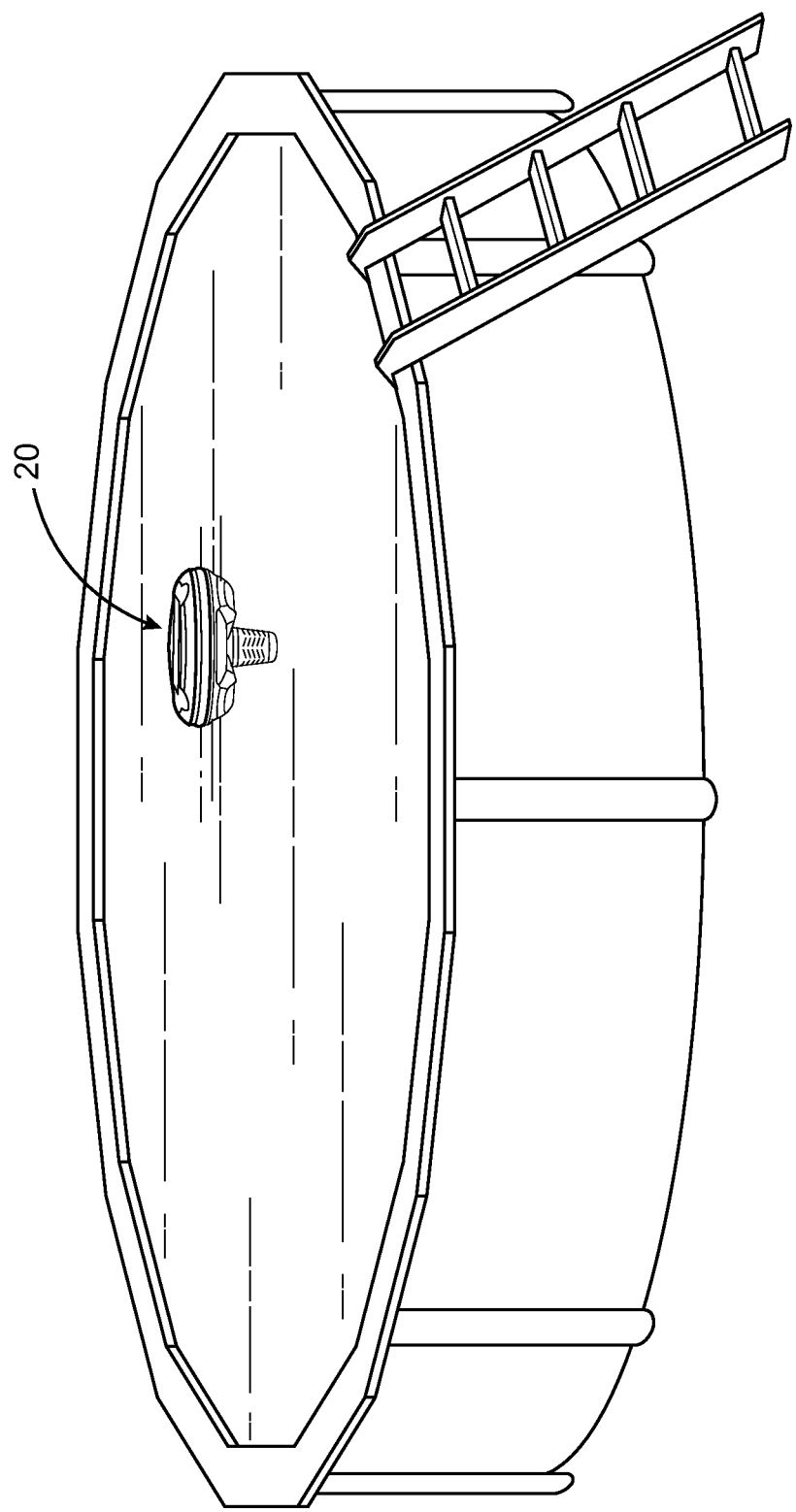
FIG. 1 is a perspective view illustrating an exemplary embodiment of the floating pool water controller in accordance with this invention in use.
Figure 2:
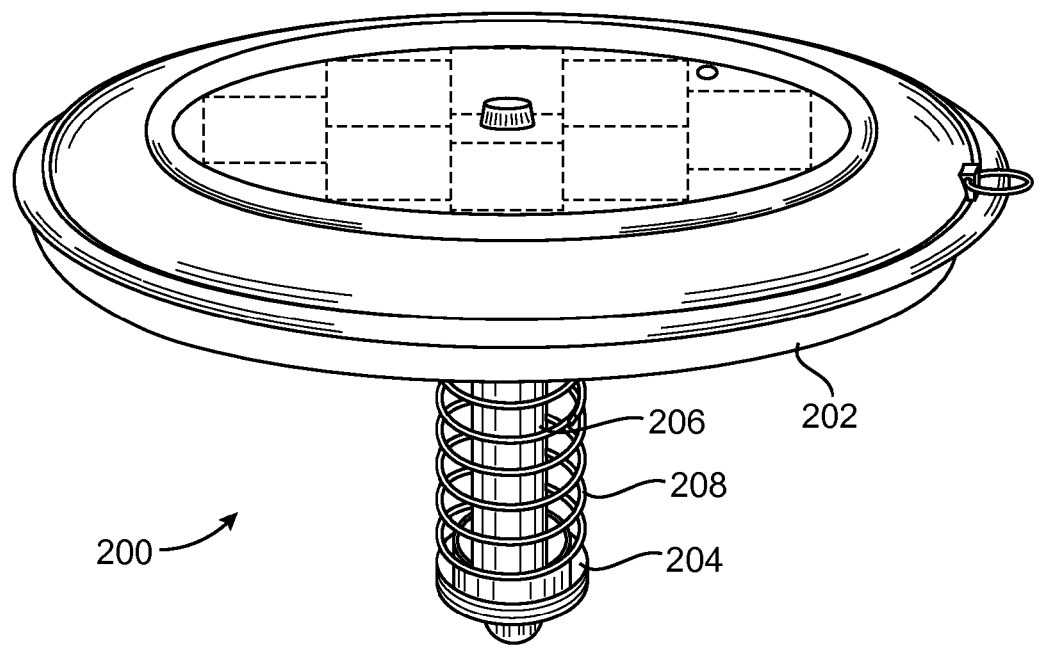
FIG. 2 is a prior art example of a floating controller.

With particular reference to FIG. 1, there is shown the pool controller, generally indicated by the numeral 20, in use. The controller 20 is launched from the side of the pool and allowed to float freely throughout the pool. This provides a random and effective mix of the Cu ion dispensed into the pool.

While the foregoing detailed description has described several embodiments of the floating pool water controller for dispensing germicide and antimicrobial material into a swimming pool in accordance with this invention, it is to be understood that the above description is illustrative only and not limiting of the disclosed invention. It will be appreciated there are also various modifications to the housing, the LED light assemblies and probe that are suitable for use in the exemplary embodiments discussed above and that there are numerous embodiments that are not mentioned but within the scope and spirit of this invention. Thus, the invention is to be limited only by the claims as set forth below.

What is claimed is:

1. A floating pool water controller for dispensing germicide and antimicrobial material into a swimming pool, the controller comprising:

a housing adapted for floating on the pool water;

means for dispensing Cu ion into the pool water defining a dispenser assembly, the dispenser assembly connected to the housing;

control means for adjusting the amount of Cu ion dispensed into the pool water connected to the housing; and sensing means defining a probe extending from the housing into the pool water for sensing pool water temperature, pool water pH level, pool water total chlorine level and pool water alkalinity that affect conductivity and ability to accept Cu ions of the pool water, a remote transmitting and receiving device in wireless communication with the sensing means to receive real time data relating to pool water temperature, pool water pH level, pool water total chlorine level and pool water alkalinity;

whereby, upon receiving the real time data relating to pool water temperature, pool water pH level, pool water total chlorine level and pool water alkalinity, a user of the remote transmitting and receiving device transmits a signal to the controller to adjust a current level on the means for dispensing Cu ion into the pool water to adjust and dispense the amount of Cu ion into the pool water, wherein increasing the current level increases the amount of Cu ions released and decreasing the current level decreases the amount of Cu ions released.

2. A floating pool water controller, as set forth in claim 1, wherein the dispenser assembly for dispensing Cu ion into the pool water includes:

the housing having a top and a bottom, a sub-housing defining dispenser housing connected to the bottom of the housing;

the dispenser housing exposed to pool water and including:

a source of Cu;

an electrode for reacting with the Cu in pool water to produce Cu ions; and a power source for electricity for activating the electrode and creating Cu ions.

3. A floating pool water controller, as set forth in claim 2, wherein the source of Cu comprises a brass ingot.

4. A floating pool water controller, as set forth in claim 3, wherein the electrode comprises a coil of stainless steel wound around the brass ingot.

5. A floating pool water controller, as set forth in claim 4, wherein the power source comprises batteries.

6. A floating pool water controller, as set forth in claim 5, wherein the batteries are rechargeable.

7. A floating pool water controller, as set forth in claim 6, wherein the controller includes a means of renewing the rechargeable batteries power.

8. A floating pool water controller, as set forth in claim 7, wherein the means of renewing the rechargeable batteries power comprising a solar cell mounted atop the housing and exposed to sunlight.

9. A floating pool water controller, as set forth in claim 4, wherein the brass ingot is an alloy of at least Cu and Zn.

10. A floating pool water controller, as set forth in claim 4, wherein the brass ingot is an alloy of at least Cu and Zn and also including Ag (silver).

11. A floating pool water controller, as set forth in claim 4, wherein the brass ingot is an alloy of at least Cu and Zn and free from Pb (lead).

12. A floating pool water controller, as set forth in claim 4, wherein the brass ingot is an alloy of at least Cu and Zn and tin.

13. A floating pool water controller, as set forth in claim 1, wherein the housing has a bottom surface and includes an illumination member attached generally to the bottom surface, a lens covering the illumination member.

14. A floating pool water controller, as set forth in claim 13, wherein the illumination member comprises one or more LEDs.

15. A floating pool water controller, as set forth in claim 1, wherein the controller includes a display member for displaying readings sensed by the probe.

16. A floating pool water controller for dispensing germicide and antimicrobial material into a swimming pool, the controller comprising:

a housing adapted for floating on the pool water, wherein the housing having a top and a bottom, a sub-housing defining dispenser housing connected to the bottom of the housing;

the dispenser housing exposed to pool water and including:

a source of Cu;

an electrode for reacting with the Cu in pool water to produce Cu ions; and a power source for electricity for activating the electrode and creating Cu ions;

a controller coupled to the housing adjusting the amount of Cu ion dispensed into the pool water; and sensing device defining a probe extending from the housing into the pool water for sensing pool water temperature, pool water pH level, pool water total chlorine level and pool water alkalinity that affect conductivity and ability to accept Cu ions of the pool water, a remote transmitting and receiving device in wireless communication with the sensing means to receive real time data relating to pool water temperature, pool water pH level, pool water total chlorine level and pool water alkalinity;

whereby, upon receiving the real time data relating to pool water temperature, pool water pH level, pool water total chlorine level and pool water alkalinity, the remote transmitting and receiving device transmits a signal to the controller to adjust a current level on the electrode to adjust and dispense the amount of Cu ion into the pool water.

* * * * *